US012067933B2

(12) United States Patent
Hekmat et al.

(10) Patent No.: US 12,067,933 B2
(45) Date of Patent: Aug. 20, 2024

(54) COMPACT PIXEL DRIVER FOR MICRO-LED DISPLAYS

(71) Applicant: Tectus Corporation, Saratoga, CA (US)

(72) Inventors: Mohammad Hekmat, Portola Valley, CA (US); Renaldi Winoto, Los Gatos, CA (US)

(73) Assignee: Tectus Corporation, Saratoga, CA (US)

( * ) Notice: Subject to any disclaimer, the term of this patent is extended or adjusted under 35 U.S.C. 154(b) by 0 days.

(21) Appl. No.: 18/333,374

(22) Filed: Jun. 12, 2023

(65) Prior Publication Data

US 2024/0249665 A1 Jul. 25, 2024

Related U.S. Application Data

(60) Provisional application No. 63/440,895, filed on Jan. 24, 2023.

(51) Int. Cl.
*G09G 3/32* (2016.01)
*G09G 3/20* (2006.01)

(52) U.S. Cl.
CPC ............. *G09G 3/32* (2013.01); *G09G 3/2014* (2013.01); *G09G 2300/0857* (2013.01); *G09G 2320/0626* (2013.01)

(58) Field of Classification Search
CPC .. G09G 3/32; G09G 2320/064; G09G 3/3233; G09G 3/2003; G09G 3/2081; G09G 3/2014; G09G 2320/0626; G09G 2320/0613; G09G 2300/0842; G09G 2310/0264; G09G 2300/0852; G09G 2300/0857; G09G 2330/028; H01L 27/156; H01L 27/1214; H01L 2924/12041; H05B 45/325; H05B 45/52; H05B 45/10;

(Continued)

(56) References Cited

U.S. PATENT DOCUMENTS

| | | | |
|---|---|---|---|
| 9,818,337 | B2 | 11/2017 | Li |
| 10,157,572 | B2 | 12/2018 | Lee |

(Continued)

FOREIGN PATENT DOCUMENTS

| | | | |
|---|---|---|---|
| CN | 111754933 A | * 10/2020 | |

OTHER PUBLICATIONS

Guo (Year: 2020).*

(Continued)

*Primary Examiner* — Sanjiv D. Patel
(74) *Attorney, Agent, or Firm* — Fenwick & West LLP

(57) ABSTRACT

A micro-LED display has an array of separately controllable micro-LEDs and corresponding pixel drivers. The pixel drivers have pulse-width modulation (PWM) generator circuits for the LEDs. The PWM generator circuits include the following. N input nodes are coupled to receive N control bits that determine a brightness of the LEDs. An output node is coupled to output the drive signal to the LEDs. Each of N transistors are connected between one of the input nodes and the output node. Each transistor is controlled by a clock signal $CK_n$ and couples the input node to the output node as controlled by the clock signal $CK_n$.

19 Claims, 9 Drawing Sheets

(58) Field of Classification Search
CPC .. H05B 45/44; H10K 59/129; H10K 59/1213; H10K 59/35; H10K 59/12
See application file for complete search history.

(56) References Cited

U.S. PATENT DOCUMENTS

| | | | | |
|---|---|---|---|---|
| 10,217,402 | B1 | 2/2019 | Vahid Far | |
| 11,049,448 | B2 | 6/2021 | Knez | |
| 11,170,705 | B2 | 11/2021 | Lee | |
| 11,238,783 | B2 | 2/2022 | Lee | |
| 11,482,165 | B2 | 10/2022 | Lee | |
| 11,521,543 | B2 | 12/2022 | Morris | |
| 2009/0146988 | A1 | 6/2009 | Johnson | |
| 2014/0049182 | A1 | 2/2014 | Kawae | |
| 2015/0356915 | A1 | 12/2015 | Seo | |
| 2016/0027385 | A1 | 1/2016 | Li | |
| 2022/0223103 | A1 | 7/2022 | Xi | |
| 2022/0415964 | A1 | 12/2022 | Li | |
| 2023/0299228 | A1* | 9/2023 | Pynn | H01L 33/0095 257/79 |

OTHER PUBLICATIONS

Seong et al, Multi-bit MIP (Memory-in-Pixel)-based Pixel Circuit of CMOS Backplane for Micro-LED Display, SID Digest p. 359-362, (2020).
Shigeo Mikoshiba, Visual Artifacts Generated in Frame-Sequential Display Devices: An Overview, SID Digest p. 384-387, (2000).

* cited by examiner

COMPACT PIXEL DRIVER FOR MICRO-LED DISPLAYS

CROSS-REFERENCE TO RELATED APPLICATION(S)

This application claims priority under 35 U.S.C. § 119(e) to U.S. Provisional Patent Application Ser. No. 63/440,895, “Compact Pixel Driver,” filed Jan. 24, 2023. The subject matter of all of the foregoing is incorporated herein by reference in its entirety.

BACKGROUND

1. Technical Field

This disclosure relates generally to displays.

2. Description of Related Art

Displays have become an important part of modern society. They are used in a wide range of devices such as TVs, smartphones, tablets, laptops, digital signage, and augmented reality and virtual reality devices. They are also used for many different applications, including entertainment, communication, education, and work. Displays can provide high-quality visual information, and they come in different sizes, resolutions, and formats to address different needs and preferences.

In particular there is high demand for small, bright and efficient displays, for example as can be used in small mobile devices. While there is also a high demand for large displays, such as those used in large size TVs and computer monitors, the design considerations for small displays are different than those for large displays. Hence there is a need for new and improved display technologies.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

Figure 1:
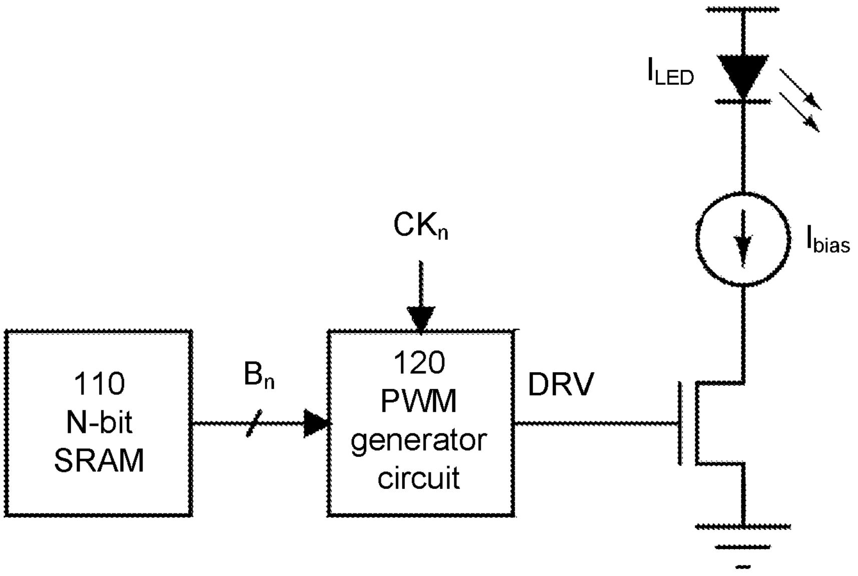
FIG. 1 is a block diagram of a multi-bit, memory-in-pixel-based, pulse width modulation (PWM) pixel driver.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

A micro-LED display includes a light emission layer and a backplane layer. The light emission layer may be an array of LEDs. For example, the LEDs may use GaN quantum well active layers, which are fabricated on a GaN-on-sapphire or GaN-on-Si substrate. Other materials systems may also be used. Organic LEDs (OLEDs) may also be used. The backplane may be fabricated on a Si CMOS wafer. The two wafers may then be bonded together so that CMOS circuitry provides drive current to the LEDs. Micro-LED displays may also be constructed using techniques other than wafer-to-wafer bonding.

Generally the term “micro-LED” means that the size of a display pixel is very small. The pitch, or distance from the edge of one pixel to the corresponding edge of its nearest neighbor is also very small. For example, micro-LEDs may be as small as about 4 m or less, and also laid out with a pitch of about 4 m or less. When frontplane and backplane wafers are combined to form pixels, the area of the CMOS driver circuitry preferably does not exceed the area occupied by the LEDs. The CMOS driver circuitry may be positioned below the LEDs.

Within the backplane, pixel driver circuits supply and control current to LEDs of individual display pixels to vary their brightness. The current may be varied via pulse amplitude modulation (PAM), pulse width modulation (PWM) or a combination of the two techniques. In some implementations PAM is used to control the brightness of the display as a whole, while PWM is used to control the brightness of individual pixels.

PWM may be implemented in CMOS digital circuits in a small area. CMOS technology nodes are now so small that each display pixel (or cluster of pixels) may have its own local memory (such as SRAM), and that enables each pixel to have its own PWM generator circuit. However, the PWM generator circuit cannot take up too much area, especially when the pixel size is about 3 or 4 m or less. The available area may be further reduced if separate generator circuits are needed for different subpixels (e.g., red, green and blue subpixels) within each pixel.

As described herein, a PWM generator circuit may be made more compact (i.e., occupy less area) by taking advantage of certain properties of the pulse width modulation for this particular application. In PWM, the temporal width of the drive signal is modulated to be longer or shorter, depending on the desired brightness for the LED. This can be implemented by using a set of N clock pulses $CK_n$, n=1 to N, of different widths and a set of corresponding N control bits $B_n$ for each pixel or subpixel that determine which clock pulses are activated for that pixel. The total pulse width is the sum of the pulse widths of the activated clock pulses.

The PWM generator circuit for each pixel may be designed as a modified multiplexer. In a conventional multiplexer, control bits are the select inputs for the multiplexer. Here, however, control bits $B_n$ are the signal inputs to the multiplexer and clock signals $CK_n$ are the select inputs to the multiplexer. The multiplexer may be simplified because the clock is designed such that not more than one clock signal $CK_n$ is asserted at any time. The modified circuit does not need the ability to resolve contentions among select inputs as would be the case in a conventional multiplexer. The PWM generator may be implemented using transistors whose source or drain is connected to the control bit $B_n$ and gate is connected to the clock signal $CK_n$. This design reduces the area occupied by the circuit.

FIG. 1 is a block diagram of a multi-bit, memory-in-pixel-based, PWM pixel driver. In the example of FIG. 1, $CK_n$ are non-overlapping clock signals $CK_n$ for n=1 to N. The memory 110 stores the N corresponding control bits $B_n$, each of which determines whether the corresponding clock signal is activated. The memory 110 may be SRAM, or other kinds of memory such as magnetic RAM, resistive RAM, or dynamic RAM. If control bit $B_n$ is asserted, then the corresponding pulse $CK_n$ is activated and adds to the aggregate pulse width of the drive signal DRV. The PWM generator circuit 120 receives the control bits $B_n$ and clock signals $CK_n$, and generates the pulse width modulated drive signal DRV. The drive signal DRV controls the LED current, $I_{LED}$, and therefore the brightness of the LED. Of course, the complementary circuit may also be implemented where the drive signal that controls the LED current is DRV_bar, where the_bar indicates the complement.

From a Boolean operation point of view, the generator circuit 120 performs a logical AND operation between each clock signal $CK_n$ and its corresponding control bit $B_n$ to produce individual component pulses $CP_n$, followed by a logical OR operation between these component pulses $CP_n$:

$$CP_n = CK_n \text{ AND } B_n$$

$$DRV = CP_1 \text{ OR } CP_2 \text{ OR} \ldots CP_N \qquad (1)$$

Figure 2A:
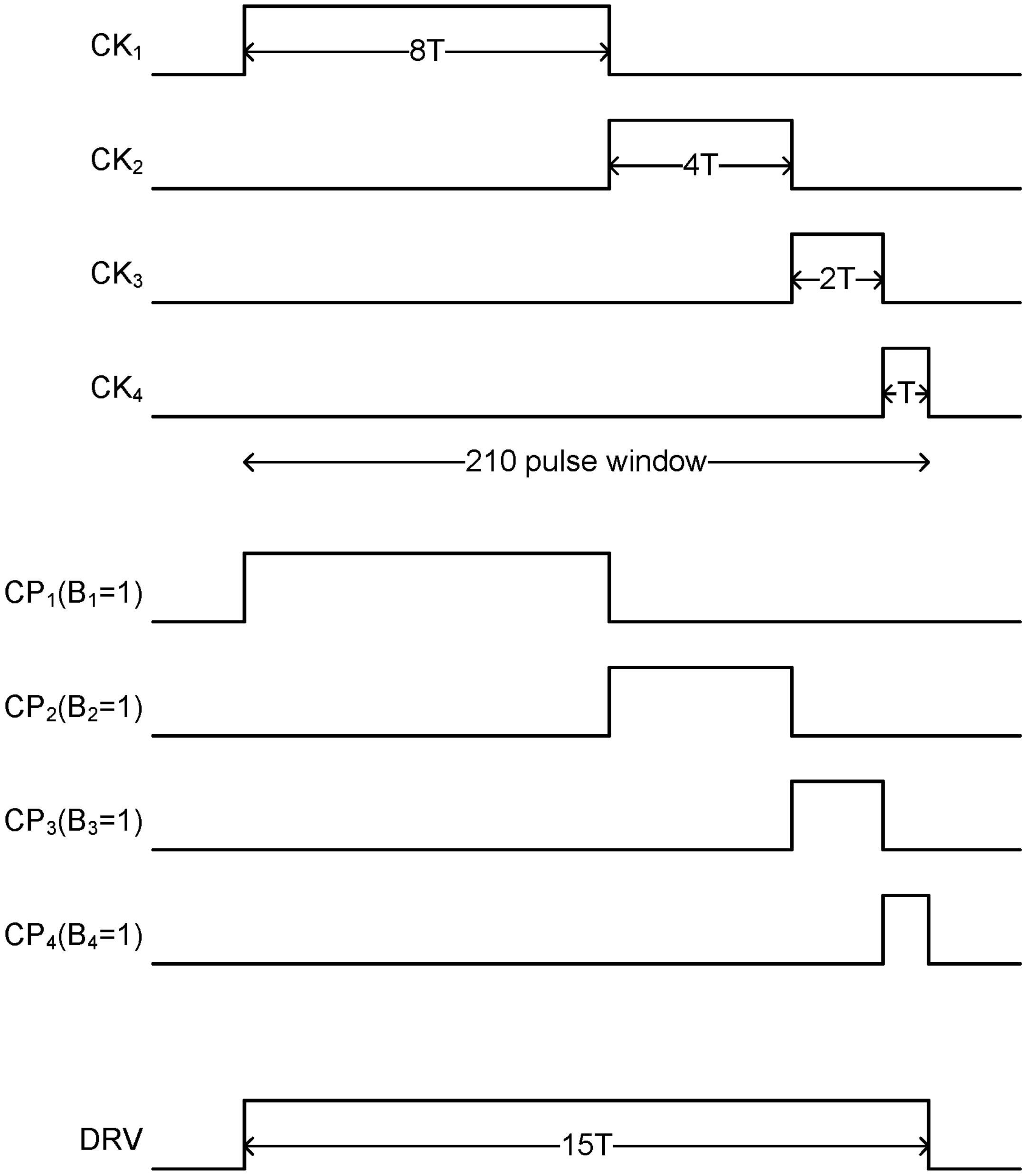
FIGS. 2A and 2B are timing diagrams of operation of the PWM generator circuit of FIG. 1.
Figure 2B:
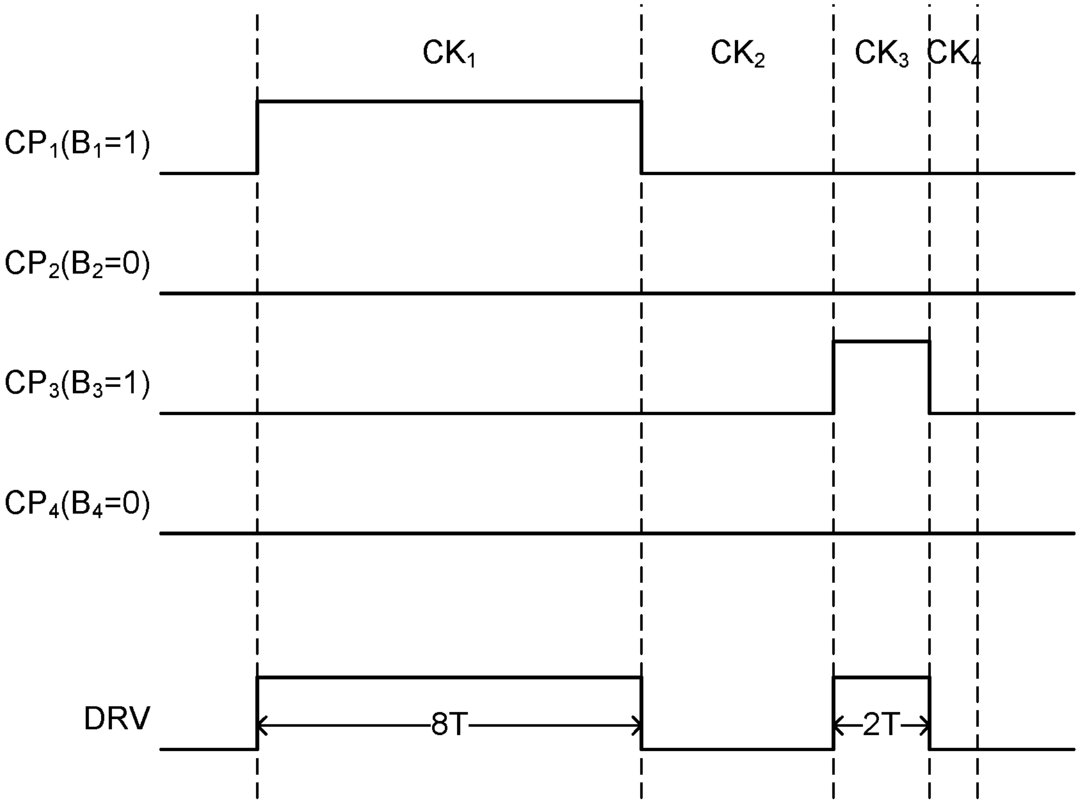

FIGS. 2A and 2B are timing diagrams of operation of the PWM generator circuit for bit sequences of $B_n$=1111 and 1010, respectively, where n=1 is the most significant bit. The corresponding clock signals have pulse widths that increase by powers of 2. If clock signal $CK_4$ has a pulse width of T, then $CK_3$ has a pulse width of 2T, $CK_2$ has a pulse width of 4T, etc. The clock signals are binary weighted. Each clock pulse is twice as long as the clock pulse selected by the next most significant bit. The pulse widths of the clock signals $CK_n$ increase by powers of 2 for different values of n. However, binary weighting is not required. Other weightings may be used, including equal width pulses. In this example, the clock pulses are adjacent to each other but non-overlapping, and the time window occupied by the clock signals is referred to as the pulse window 210.

FIG. 2A shows a timing diagram for $B_n$=1111. The top four timing diagrams show the clock signals $CK_n$ as previously described. Because all four bits $B_n$ are asserted, all four clock pulses $CK_{1-4}$ are active resulting in the component pulses $CP_{1-4}$ shown in the timing diagrams below the clock signals. The resulting drive signal DRV is the concatenation of these component pulses $CP_{1-4}$, as shown in the bottom timing diagram. In FIG. 2A, the DRV signal has an aggregate pulse width of 15T.

FIG. 2B shows a timing diagram for $B_n$=1010. The timing diagrams for the clock signals $CK_n$ are omitted since they are the same as in FIG. 2A, but their pulse widths are indicated by the dashed vertical lines. In this figure, only bits $B_1$ and $B_3$ are asserted, so only component pulses $CP_1$ and $CP_3$ are activated, and the other two clock pulses are not. The resulting drive signal DRV has an aggregate pulse width of 8T+2T=10T. T is selected to be small enough that the gaps between pulses are not observable by humans.

Figure 3:
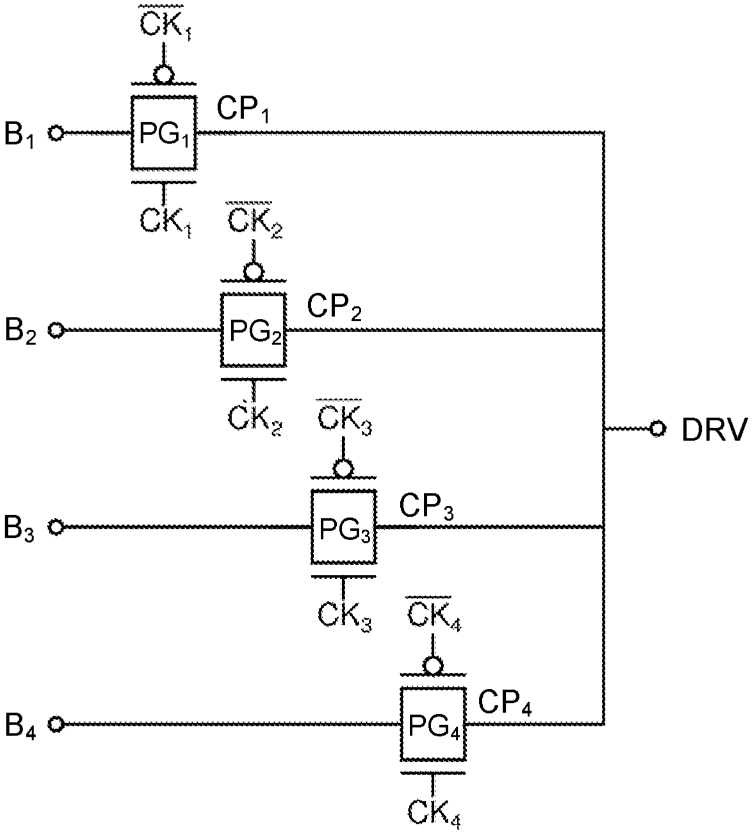
FIG. 3 is a circuit diagram of a four-bit implementation of a PWM generator circuit.

FIG. 3 is a circuit diagram of a four-bit example implementation of a PWM generator circuit that implements the timing diagrams shown in FIG. 2. The generator circuit in FIG. 3 has N input nodes that are coupled to receive the N control bits $B_n$ from the local memory. The PWM generator circuit also receives the clock signals $CK_n$ and generates the drive signal DRV from the incoming signals $B_n$ and $CK_n$. In this design, the generator circuit has N input arms, one between each of the N input nodes $B_n$ and the output node DRV. Each arm n contains a switch that couples the corresponding input node $B_n$ to the output node DRV, as controlled by the clock signal $CK_n$. In this particular implementation, the switches are implemented as two-transistor pass gates $PG_n$. Each pass gate includes two opposite polarity transistors (NMOS and PMOS), which are controlled by the clock signal $CK_n$ and its complement respectively. For both transistors, the source and drain are connected between one of the input nodes and the output node. The gates are controlled by signals based on the clock signal $CK_n$. When the clock signal $CK_n$ is asserted, both transistors turn on and signal $B_n$ is passed to the output node DRV.

The outputs of the pass gates $PG_n$ are the component pulses $CP_n$, which are combined to form the output signal DRV, which drives the LED. Because only one clock pulse $CK_n$ will be asserted at any time, this means that only one pass gate $PG_n$ will be open at any time, which means that only one component pulse $CP_n$ will be active at any time. As a result, the component pulses $CP_n$ may be combined simply by connecting all of them to the output node DRV. No additional circuitry is needed.

The PWM generator circuit functions as a multiplexer implemented using pass gates and without protection against contention among the select signals $CK_n$. A conventional multiplexer would be implemented using Boolean logic gates, but the simpler pass gates are used instead in FIG. 3, which reduces the transistor count and the area of the circuit. In addition, a conventional multiplexer would include circuitry that handles conflict situations when more than one clock signal $CK_n$ is asserted. The generator circuit of FIG. 3 does not contain this protection, because it is unnecessary since the clock signals $CK_n$ are not overlapping by design. This further reduces the transistor count and area.

An N-bit PWM generator circuit that uses logic gates to implement Eqn. 1 would require at least 6N transistors: 4 transistors for a NAND gate to construct $CP_n$ and 2 transistors for the OR operation, per bit. It could be even more, since the OR operation may require multiple gates and stages if N is large. For comparison, the circuit in FIG. 3 uses only 2N transistors. In addition, the design in FIG. 3 may be extended straightforwardly for larger values of N by adding additional input arms while keeping the transistor count to 2N.

Figure 4A:
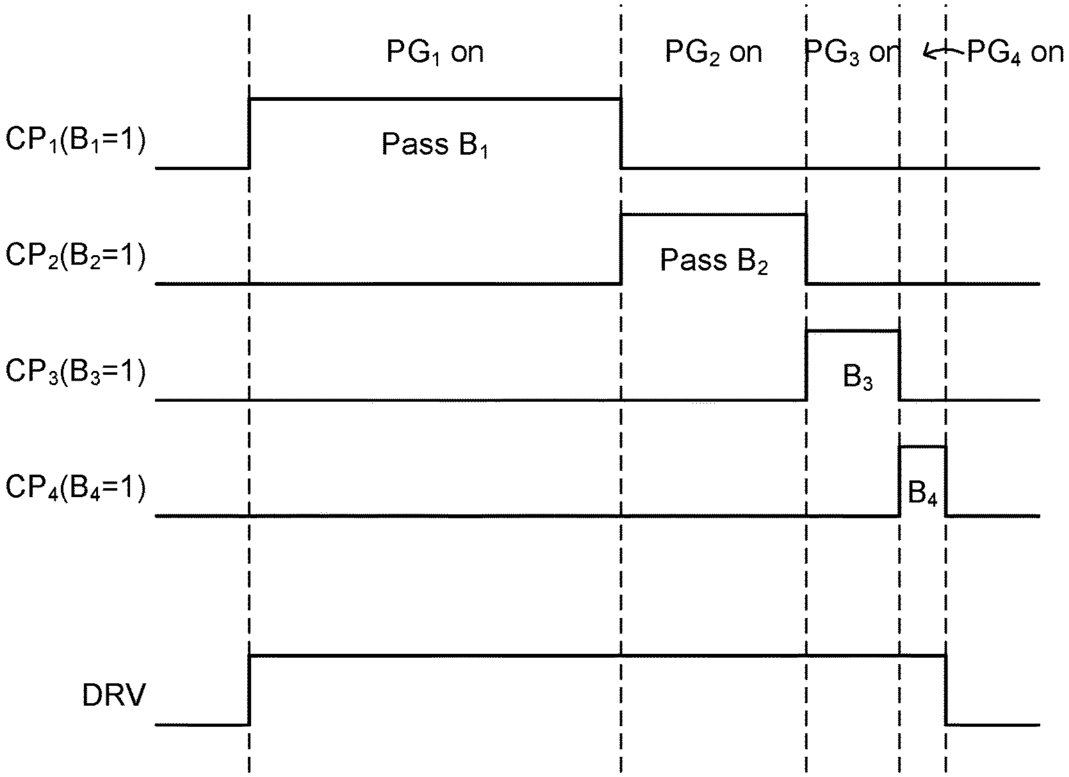
FIGS. 4A and 4B are timing diagrams of operation of the PWM generator circuit of FIG. 3.
Figure 4B:
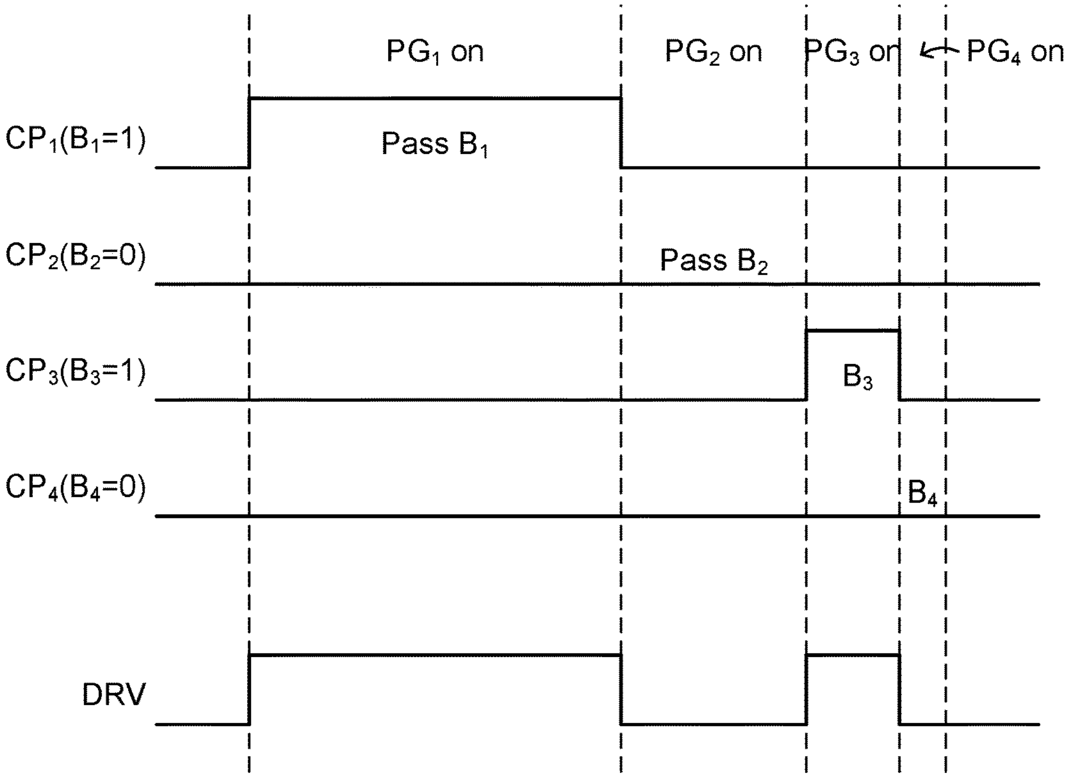

FIGS. 4A and 4B are timing diagrams of operation of the PWM generator circuit of FIG. 3, for bit sequences of $B_n$=1111 and 1010 respectively. These are analogous to the timing diagrams of FIGS. 2A and 2B. The pulse widths of the clock signals $CK_n$ are indicated by the dashed vertical lines. As indicated by the notation, the activation of clock pulse $CK_1$ opens the corresponding pass gate $PG_1$ while the other pass gates remain closed (because the other clock pulses are not asserted). When pass gate $PG_1$ is open, it passes the value of $B_1$=1, producing the component pulse $CP_1$. The control bit $B_1$ is stored in SRAM. Opening the pass gate $PG_1$ connects the SRAM memory cell to the drive output DRV. The same is true for the other clock signals $CK_n$ and their corresponding pass gates $PG_n$ and component pulses $CP_n$. The resulting DRV signal is shown at the bottom of FIG. 4A.

FIG. 4B operates the same way as FIG. 4A, but for a different bit sequence of $B_n$=1010. When clock pulse $CK_2$ is activated, pass gate $PG_2$ opens and passes the control bit $B_2$=0. The same is true for bit $B_4$=0. This results in the drive signal DRV with shorter aggregate pulse width shown at the bottom of FIG. 4B.

Figure 5A:
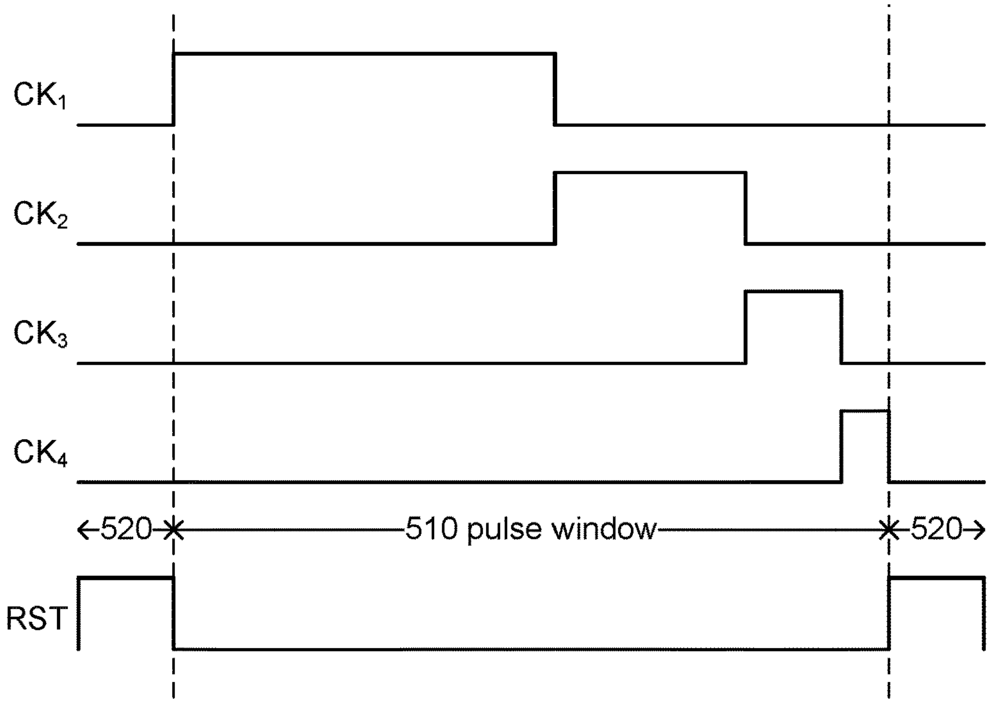
FIG. 5A is a timing diagram that shows time reserved for programming memory cells.

FIG. 5A is an example timing diagram that shows time reserved for programming the memory cells during every frame. The duration of the clock signals $CK_n$ defines a pulse window 510 when the clock signals may be activated. Dead time 520 between these windows may be used to program the SRAM memory with bit sequences $B_n$. During this programming window 520, the clock signals $CK_n$ are not activated. The DRV output is undriven, leaving it in its most recent state. If this is not desirable, it may be corrected by the addition of a reset mechanism, as illustrated in FIG. 5B.

Figure 5B:
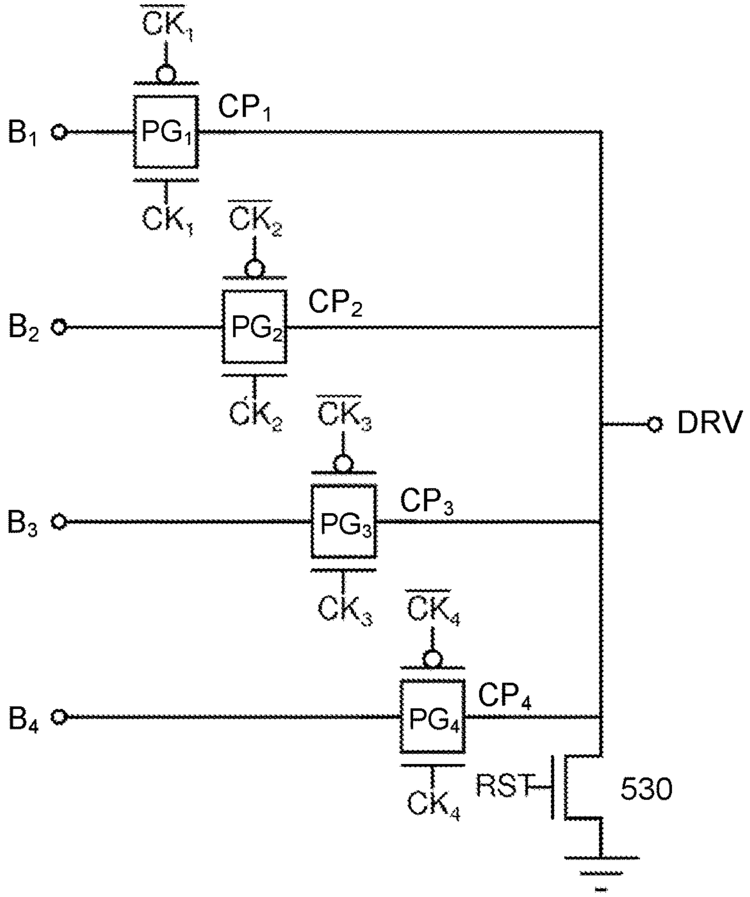
FIG. 5B is a circuit diagram illustrating the addition of a reset switch to the PWM generator circuit of FIG. 3.

FIG. 5B is a circuit diagram illustrating the addition of a reset switch 530 to the PWM generator circuit of FIG. 3. In FIG. 5B, the reset switch 530 is a transistor driven by the RST signal. The RST signal is asserted during the programming window 520. This pulls DRV to zero, or logical low, when no pass gates $PG_n$ are turned on. Even with the addition of the RST control, the N-bit PWM generator circuit can be implemented using as few as (2N+1) transistors.

Figure 6A:
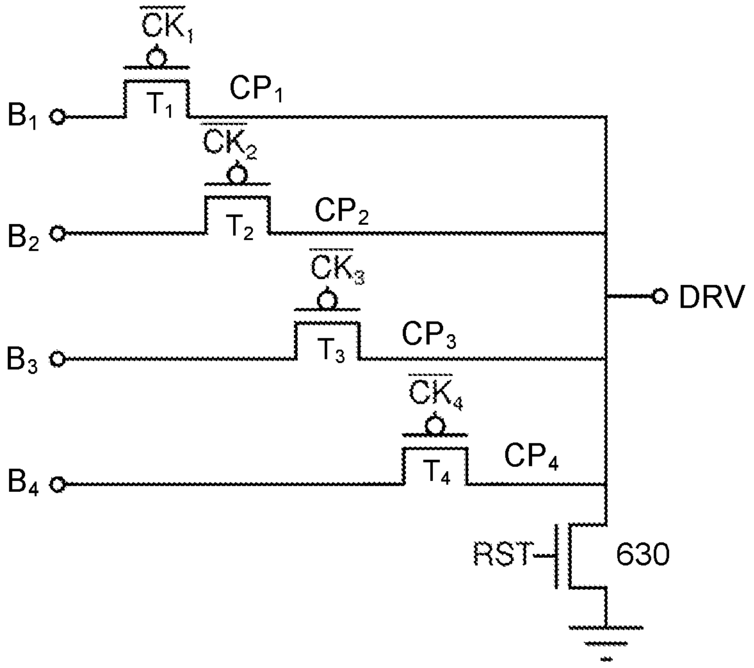
FIG. 6A is a circuit diagram of another four-bit implementation of a PWM generator circuit.

The examples of FIGS. 3-5 use pass gates as switches. Pass gates use both NMOS and PMOS transistors and also use both polarities of the CK signals to operate properly. FIG. 6A is a circuit diagram of a four-bit example implementation of a PWM generator circuit that does not use both polarities of transistors and clock signals.

Figure 6B:
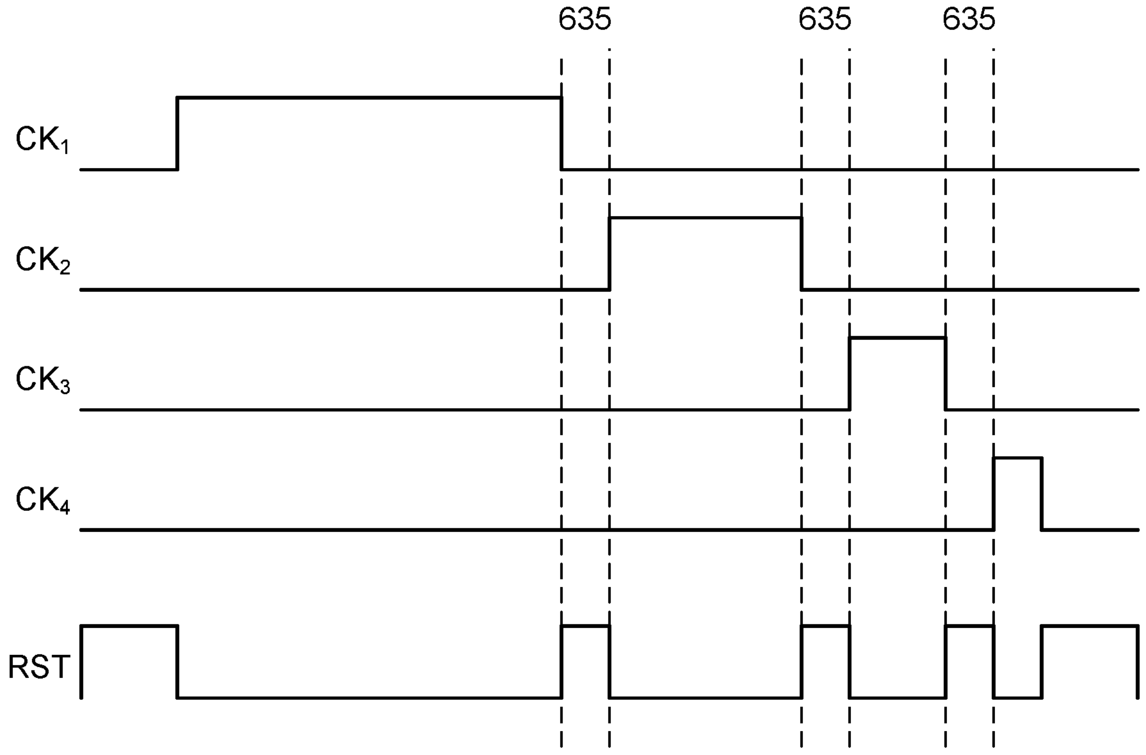
FIG. 6B are timing diagrams of operation of the PWM generator circuit of FIG. 6A.

In FIG. 6A, the switches in each input arm are implemented as a single transistor $T_n$ controlled by the corresponding clock signal $CK_n$. The source and drain of each transistor are connected between one the input nodes and the output node DRV. The gate of each transistor is connected to $CK_n$_bar. The generator circuit also includes a RST transistor 630. FIG. 6B is the corresponding timing diagram, which introduces dead time 635 between the clock pulses $CK_n$. The reset signal RST is asserted during these dead times. In this version, the N-bit PWM generator circuit uses as few as (N+1) transistors for N-bit PWM current control. The clock signals $CK_n$ are inverted. Each of the switches is implemented with a single MOS transistor $T_n$ (PMOS in this example) and the circuit uses only a single polarity of the clock signals.

PMOS transistors are generally capable of pulling a signal line high, but not low. The extra reset pulses in FIG. 6B during the dead times 635 ensure that DRV is pulled low before a rising edge of the next clock signal $CK_n$. The use of the reset device and reset pulses in the dead time, allows the use of single-transistor gates with single-polarity input. Slightly increasing the complexity of the reset signal RST allows the elimination of almost half of the transistors shown in FIG. 5B. The decrease from (2N+1) to (N+1) transistors saves valuable area on a semiconductor die, allowing the circuit (and the associated memory) to fit under (and within the same area as) a very small pixel.

The complementary circuit may also be implemented, using NMOS transistors instead of PMOS transistors. In that case, the gates are connected to $CK_n$ and the reset transistor is connected to the other supply node Vdd rather than ground.

Figure 6C:
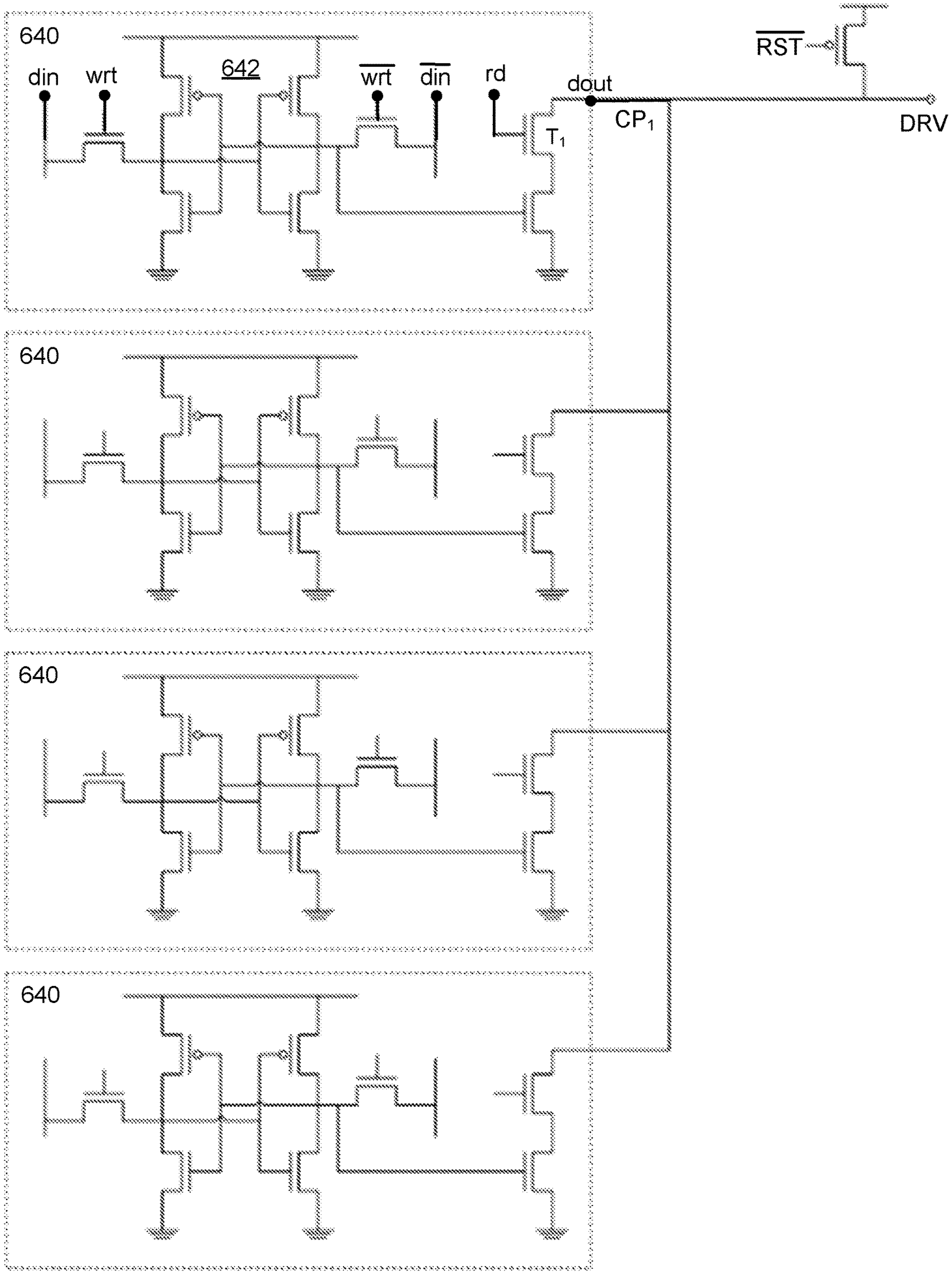
FIG. 6C is a circuit diagram of another four-bit implementation of a PWM generator circuit plus local memory, using standard memory cells.

FIG. 6C shows an example using NMOS transistors and using a standard memory cell from a cell library. In this example, the standard memory cell is an 8T (eight transistor) SRAM cell. These cells have been optimized and are provided by the fab. In FIG. 6C, the extent of the memory cells 640 is indicated by the dotted lines. The top memory cell is annotated and described below. The other memory cells are analogous. Comparing to FIG. 6A, the memory cell 640 includes both the local memory 642 storing bit $B_1$ (which is not shown in FIG. 6A) and the switch/transistor $T_1$.

The memory cell 640 from the cell library includes ports or nodes as indicated by the solid circles. din (data in) and wrt (write) and their complements are used to program bit $B_1$ into the SRAM cell 642, which consists of four cross-coupled transistors. These may be used during a programming window (such as window 520 in FIG. 5A) to update the value of the stored bit $B_1$. rd (read) is a read control node that is used to control read out of the stored data. When rd is asserted, bit $B_1$ is available at the read port dout. In FIG. 6C, the read control node rd is connected to the clock signal $CK_1$. To complete the circuitry, the outputs dout of the four memory cells 640 are connected to the drive node DRV, and a reset transistor is also added.

The above examples use transistors to directly connect bits of local memory to drive nodes for LEDs. They occupy less area than other implementations because, for example, they do not contain any Boolean logic gates. In addition, they assume that only one clock signal $CK_n$ is asserted at any time and do not contain circuitry capable of resolving conflicts if clock signals are concurrently asserted.

Figure 7A:
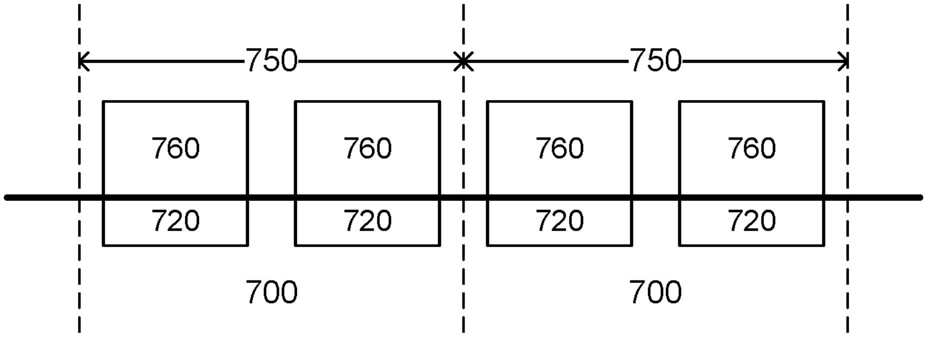
FIGS. 7A and 7B are a cross-sectional side view and an exploded perspective view of a display with an array of pixels.
Figure 7B:
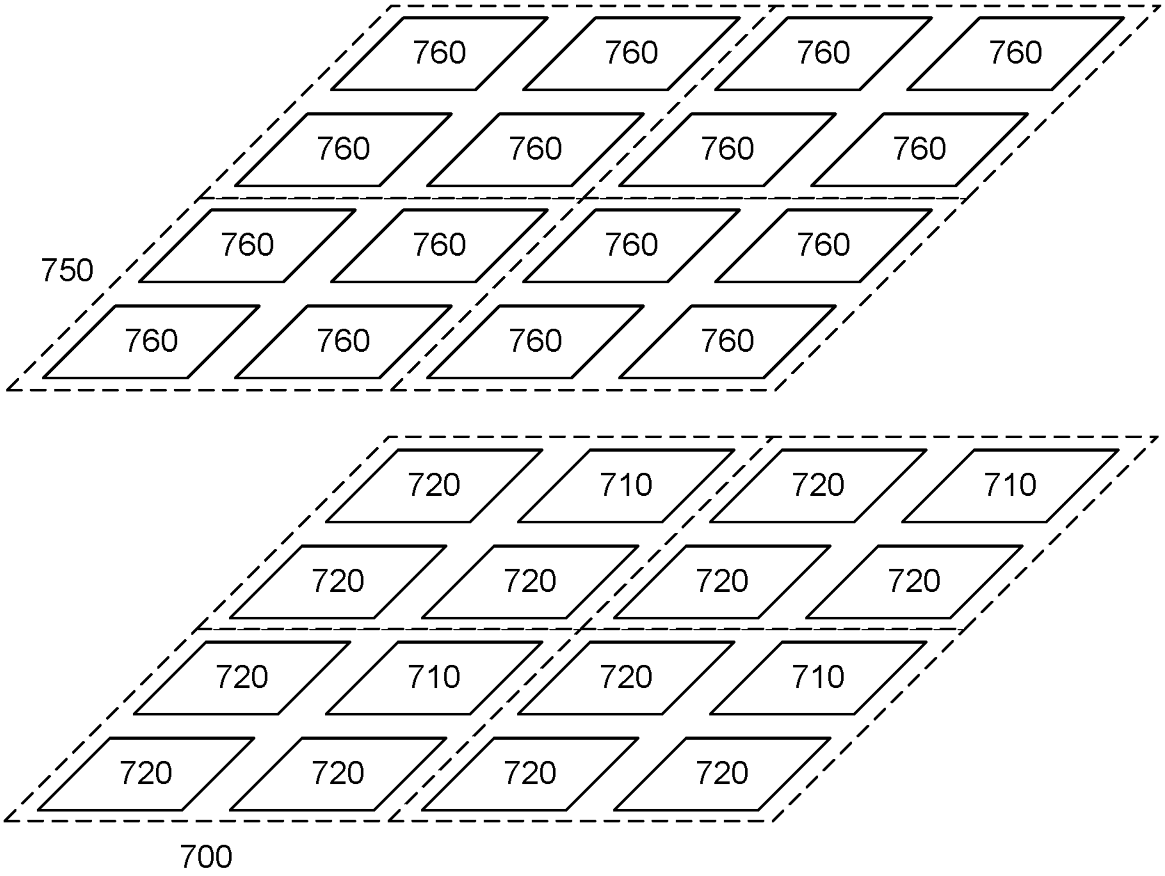

FIGS. 1-6 show PWM generator circuits for individual pixels. A display includes an array of pixels. FIGS. 7A and 7B are a cross-sectional side view and an exploded perspective view of a display with an array of pixels 750. For clarity, FIG. 7B shows the footprints of various components, but without any thickness. The top plane is the LED frontplane, and the bottom plane is the CMOS driver backplane.

FIG. 7 shows a 2×2 array of color pixels, as indicated by the dashed lines. In this example, the display is a color display and each color pixel includes a 2×2 array of micro-LEDs 760 that provide red, green and blue subpixels. Each subpixel includes one or more separately controllable micro-LEDs. This example uses a Bayer pattern of one red (R), one blue (B), and two green (G) subpixels per color pixel. This could be implemented by using different color micro-LEDs, same color micro-LEDs with color conversion materials, or broadband micro-LEDs with color filters. Other patterns may also be used, such as RRGB if the red micro-LEDs are less efficient.

The pixel driver 700 for each pixel includes three of the PWM generator circuits 720 described above and also the corresponding local memory 710. One PWM generator circuit drives the LED for the red subpixel, one drives the LED for the blue subpixel and one drives the two LEDs for the green subpixel. The backplane area for each pixel is divided into quadrants, with the three PWM generator circuits 720 located in three of the quadrants and the local memory 710 for all three generator circuits located in the fourth quadrant. With this arrangement, the pixel driver circuitry does not occupy more area than the micro-LEDs. In this particular example, the PWM generator circuits 720 and local memory 710 for each pixel are positioned under the micro-LEDs for that pixel.

The arrangement shown in FIG. 7 is just one example. Other arrangements will be apparent. For example, the micro-LEDs may be arranged as stripes, in hexagonal arrays or other geometries. There may also be different combinations of different colors or other different types of LEDs. Different arrangements of micro-LEDs to color subpixels may also be used. The pixel generator circuits also may be arranged as stripes or in other geometries. The circuits for different subpixels and pixels may not be physically segregated as shown in FIG. 7. The different instances of the circuits may also be rotated or flipped in orientation. These variations may be used to facilitate routing of circuit interconnects or sharing of common components. For example, the backplane circuitry for each individual pixel may not be the same shape as the area occupied by the light emission layer. The arrangement of backplane and light emission layer may use multi-pixel building blocks, for example repeating 2×2 or larger arrays of pixels.

Figure 8:
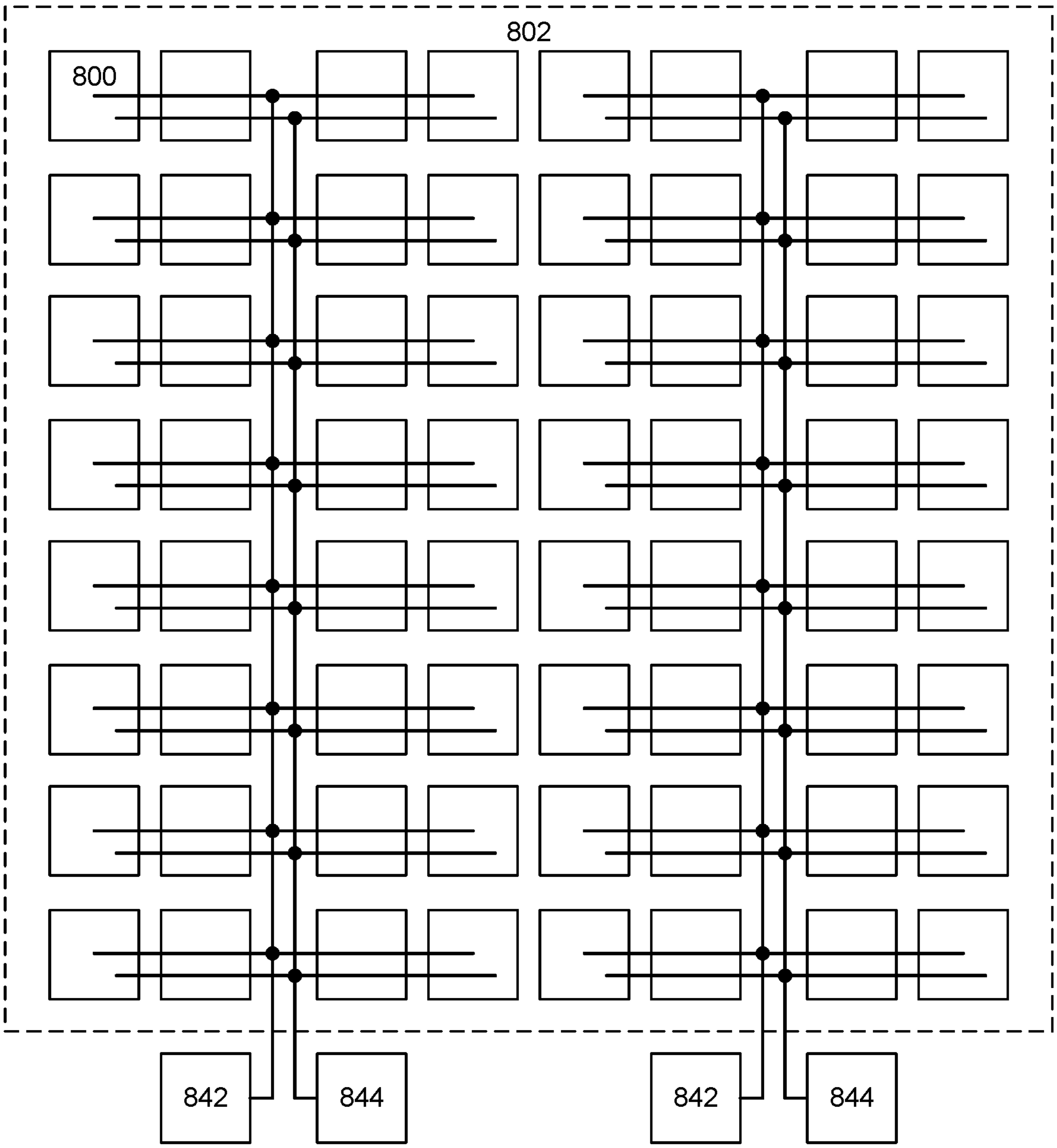
FIG. 8 is a plan view of a backplane with an array of pixel driver circuits.

FIG. 8 is a plan view of a backplane with an array of pixel driver circuits. The pixel driver circuits 800 receive clock signals $CK_n$ and reset signal RST as inputs. They also contain local memories which are programmable to store the control bits $B_n$ for each pixel.

In FIG. 8, the pixel drivers 800 are shown as squares and FIG. 8 shows an 8×8 array of these squares. The pixel drivers 800 may all receive the same clock signals $CK_n$ and reset signal RST. Accordingly, the backplane includes a clock source 842 and a RST source 844 that are located outside the array area 802 occupied by the pixel drivers. These sources generate the clock signals $CK_n$ and reset signal RST, which are then distributed to the pixel drivers by some signal distribution network. In FIG. 8, the distribution tree has a main vertical branch that runs along every fourth column and then smaller horizontal branches that service the two pixel drivers to either side of the main branch.

Note that the clock signals $CK_n$ are not the clock signals that are used to synchronize the operation of digital logic circuits. Rather, these clock signals $CK_n$ are used to determine the aggregate pulse width of the driver signals for LEDs. As such, many of the timing requirements on synchronous clock signals do not apply to these PWM clock signals. For example, the pulse widths of clock signals $CK_n$ may be on the order of the frame rate, which is much slower and provides a much larger timing tolerance. In addition, because the different pixels do not have to operate synchronously with each other, the clock signals $CK_n$ may arrive at different times at different pixel drivers 800. Thus, the designer has more freedom in designing the clock and reset distribution networks.

The pixel drivers 800 also include local memories that store the bit sequences $B_n$. These may be programmed using row and column addressing, with the memory controller also located outside the array area 802 for the pixel drivers. These local memories may be shared between pixel drivers. For example, there may be a local memory that stores the control bits for a group of pixel drivers.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A micro-LED display comprising:

an array of separately controllable micro-LEDs arranged as pixels for the display; and a plurality of pixel drivers that drive the pixels of micro-LEDs, each pixel driver comprising:

a local memory that stores bits that determine brightness of the micro-LEDs for that pixel driver;

one or more pulse width modulation (PWM) generator circuits that drive the micro-LEDs according to N bits $B_n$ stored in the local memory, each PWM generator circuit comprising N first transistors of a first polarity, each first transistor having a source, drain and gate; wherein the source and drain of each of the N first transistors are connected between one of the stored bits of the local memory and a drive node that is connected to the micro-LEDs, and the gate of each of the N first transistors is controlled by a signal based on a clock signal $CK_n$ corresponding to bit $B_n$; and reset transistors coupled between the drive nodes and a supply node.

2. The micro-LED display of claim 1 wherein the PWM generator circuits for multiple pixel drivers all receive the same clock signals $CK_n$.

3. The micro-LED display of claim 2 wherein pulse widths of the clock signals $CK_n$ increase by powers of 2 for different values of n.

4. The micro-LED display of claim 1 wherein the reset transistors are turned on during a dead time between clock signals $CK_n$.

5. The micro-LED display of claim 1 further comprising:

a clock source that generates the clock signals $CK_n$ and a reset source that generates reset signals for the reset transistors, wherein the clock source and the reset source are located outside an area occupied by the pixel drivers; and a distribution network to distribute the clock signals $CK_n$ and the reset signals from the clock source and the reset source to the PWM generator circuits.

6. The micro-LED display of claim 1 wherein the local memory and PWM generator circuits occupy an area not more than the array of micro-LEDs.

7. The micro-LED display of claim 1 wherein the local memory and PWM generator circuits are positioned underneath the array of micro-LEDs.

8. The micro-LED display of claim 1 wherein the array of micro-LEDs has a pitch of not more than 4 μm.

9. The micro-LED display of claim 1 wherein each PWM generator circuit includes not more than 6N transistors.

10. A micro-LED display comprising:

an array of separately controllable micro-LEDs arranged as pixels for the display; and a plurality of pixel drivers that drive the pixels of micro-LEDs, each pixel driver comprising:

a local memory that stores bits that determine brightness of the micro-LEDs for that pixel driver; and one or more pulse width modulation (PWM) generator circuits that drive the micro-LEDs according to N bits $B_n$ stored in the local memory, each PWM generator circuit comprising N first transistors of a first polarity, each first transistor having a source, drain and gate: wherein the source and drain of each of the N first transistors are connected between one of the stored bits of the local memory and a drive node that is connected to the micro-LEDs, and the gate of each of the N first transistors is controlled by a signal based on a clock signal $CK_n$ corresponding to bit $B_n$;

wherein each PWM generator circuit further comprises: N second transistors of a polarity opposite of the first polarity, each second transistor having a source, drain and gate; wherein the source and drain of each of the N second transistors is connected between one of the stored bits of the local memory and the drive node, and the gate of each of the N second transistors is controlled by a signal that is a complement of the signal that controls the corresponding first transistor.

11. The micro-LED display of claim 1 wherein, for each PWM generator circuit, not more than one clock signal $CK_n$ is asserted at any time.

12. The micro-LED display of claim 11 wherein the PWM generator circuits are not capable of resolving conflicts if more than one clock signal $CK_n$ is asserted at any time.

13. The micro-LED display of claim 1 wherein the PWM generator circuits do not contain any Boolean logic gates.

14. The micro-LED display of claim 1 wherein, for each bit $B_n$, the local memory storing that bit and the first transistor connected to that bit are implemented as a standard memory cell from a cell library.

15. The micro-LED display of claim 14 wherein the standard memory cell includes a read port and a read control node; wherein the stored bit is read from the read port according to a control signal applied to the read control node, and the clock signal $CK_n$ is applied to the read control node.

16. A micro-LED display having a pulse-width modulation (PWM) generator circuit for one or more LEDs in the display, the PWM generator circuit comprising:

N input nodes coupled to receive N bits $B_n$ that determine a brightness of the one or more LEDs;

an output node coupled to drive the one or more LEDs;

N first transistors of a first polarity, each first transistor having a source, drain and gate; wherein the source and drain of each of the N first transistors are connected between one of the input nodes and the output node, and the gate of each of the N first transistors is controlled by a signal based on a clock signal $CK_n$ corresponding to bit $B_n$; and N second transistors of a polarity opposite of the first polarity, each second transistor having a source, drain and gate: wherein the source and drain of each of the N second transistors is connected between one of the input nodes and the output node, and the gate of each of the N second transistors is controlled by a signal that is a complement of the signal that controls the corresponding first transistor.

17. The micro-LED display of claim 16 wherein the PWM generator circuit includes not more than 2N transistors between the N input nodes and the output node.

18. The micro-LED display of claim 16 wherein the PWM generator circuit includes not more than N transistors between the N input nodes and the output node.

19. A micro-LED display comprising:

an array of separately controllable micro-LEDs arranged as pixels for the display;

a plurality of pixel drivers that drive the pixels of micro-LEDs, each pixel driver comprising:

local memory that stores bits that determine brightness of the micro-LEDs for that pixel driver; and one or more PWM generator circuits that drive the micro-LEDs according to the bits stored in the local memory, each PWM generator circuit comprising a multiplexer that receives bits from the local memory as input signals, receives corresponding clock signals $CK_n$ as select signals, and outputs a drive signal to at least one corresponding micro-LEDs; and a reset transistor that is asserted during programming the local memory.

* * * * *